(12) United States Patent
Li et al.

(10) Patent No.: US 8,532,151 B2
(45) Date of Patent: Sep. 10, 2013

(54) PASSIVELY Q-SWITCHED MICROLASER

(75) Inventors: Dashan Li, Shanghai (CN); Shaofeng Zhang, Shanghai (CN); Chao Lv, Shanghai (CN)

(73) Assignee: Photop Suwtech, Inc., Shanghai (CN)

( * ) Notice: Subject to any disclaimer, the term of this patent is extended or adjusted under 35 U.S.C. 154(b) by 0 days.

(21) Appl. No.: 13/445,853

(22) Filed: Apr. 12, 2012

(65) Prior Publication Data

US 2012/0269214 A1  Oct. 25, 2012

(30) Foreign Application Priority Data

Apr. 22, 2011 (CN) .......................... 2011 1 20123151

(51) Int. Cl.
*H01S 3/113* (2006.01)
(52) U.S. Cl.
USPC .................... 372/11; 372/10; 372/41; 372/75

(58) Field of Classification Search
USPC .......................................... 372/11, 10, 41, 75
See application file for complete search history.

(56) References Cited

U.S. PATENT DOCUMENTS

| 6,023,479 | A  | * | 2/2000  | Thony et al. ................... | 372/11 |
| 6,778,565 | B2 | * | 8/2004  | Spuehler et al. ............... | 372/25 |
| 7,649,920 | B2 | * | 1/2010  | Welford ......................... | 372/34 |
| 2008/0247425 | A1 | * | 10/2008 | Welford ......................... | 372/10 |

* cited by examiner

*Primary Examiner* — Kinam Park

(57) ABSTRACT

A passively Q-switched laser comprises a pump laser diode, a micro laser resonant cavity including a lasing medium and a saturable absorber, a filter and a photodiode. The lasing medium and saturable absorber are bonded together, and dielectric film is coated on the surfaces of the bonded body to form the laser resonant cavity. The filter reflects a portion of the Q-switched laser pulse beam. The photodiode can detect and convert the laser pulse to electric signal for triggering purpose.

12 Claims, 2 Drawing Sheets

PASSIVELY Q-SWITCHED MICROLASER

BACKGROUND

1. Technical Field

The present invention relates to the field of lasers and, more specifically, passively Q-switched lasers.

2. Brief Description of Related Arts

The saturable absorber is used for generating short, high peak power laser pulses in passively Q-switched laser. Always, a cell filled with organic dye or a doped crystal is used as a saturable absorber. These optical elements have a special transmission characteristic that the transmission varies with the incident optical intensity. As the incident optical intensity increases, the saturable absorber becomes more transparent; and finally it saturates or bleaches, which leads to a higher transmission. So when placed into a laser resonator, a saturable absorber will act as a variable optical loss which means automatically modulating the Q-factor of the laser resonator. Because the saturation will occur in a very short time, which means the resonator loss suddenly reduces to a very small value, the stored energy in gain medium will build up laser radiation very quickly; also the depletion of the stored energy is very quickly, so short laser pulse with high peak power is generated.

Compared with active Q-switch, which always needs high voltage and fast electro-optic driver, passive Q-switch has many advantages, such as simple design, small size and low cost, for it is switched by laser radiation itself.

In recent years, passively Q-switched microchip lasers develop very quickly. These lasers are pumped by laser diode. Their compact size, low cost and simplicity give them potential for mass production and wider applications.

The major disadvantages of a passive Q-switch are the lack of a precision external trigger capability and a lower output compared to electro-optic or acousto-optic Q-switched lasers. The former is due to the switching by the laser radiation itself not by a precisely controllable external means. The latter is due to the residual absorption of the saturated passive Q-switch which represents a rather high insertion loss.

The most often used saturable absorber in passively Q-switched microchip laser is Cr:YAG to generate 1064 nm short laser pulses output, while Nd:YAG or $Nd:YVO_4$ can be used as lasing medium, as described by Zayhowski in "Microchip lasers," Optical Materials, vol. 11, pp 255-267 (1999) and U.S. Pat. No. 5,394,413. However, Cr:YAG is not suitable for Q-switching laser pulses at a wavelength longer than 1.1 μm. 1.5~1.6 μm is known to be an eyesafe wavelength range, and in recent years, pulsed laser in this range is of great in applications of eyesafe distance measurement, lidar and optical communication.

Cobalt doped solid state material, is now often used as saturable absorber to obtained laser pulse output at wavelength ranged from 1.3 μm to 1.6 μm. Compared with uranium doped $CaF_2$ or other cobalt doped crystal e.g. Co:LMA, which are also often used as saturable absorber in 1.5 μm, cobalt doped spinel crystal has a larger ground state absorption cross section and smaller excited state absorption cross section, which means easier to achieve short pulse width and high pulse energy level.

In many applications of passively Q-switched laser, a fast response photodiode is needed to receive the laser pulses signal and converts it to electrical signal for triggering purpose.

SUMMARY OF THE INVENTION

The object of this invention is to provide a passively Q-switched microlaser, and more particularly, to provide a very compact diode pumped passively Q-switched microchip laser with relatively high peak power laser pulse output.

In order to accomplish this object, a passively Q-switched microlaser is provided in this invention, comprising: a pump laser diode for emitting a pumping beam, a laser resonant cavity formed between a first mirror and a second mirror, a lasing medium disposed within said laser resonant cavity for receiving said pumping beam and producing laser gain, a saturable absorber disposed within said laser resonant cavity for generating laser pulses, a filter for reflecting a portion of said laser pulses and a photodiode for detecting said reflected laser pulses by said filter, wherein the lasing medium is disposed closer to said pump laser diode than said saturable absorber; wherein the lasing medium comprises an erbium doped solid state material; wherein saturable absorber comprises a cobalt doped solid state material.

Erbium doped solid state materials are used to generate laser output in 1.5~1.6 μm and erbium and ytterbium co-doped materials, e.g. phosphate laser glass, is most often used, in which ytterbium is used as a sensitizer to promote the absorption of pumping laser light.

Cobalt doped solid state materials, such as Co:ZnSe, Co:YSGG, $Co:MgAl_2O_4$ and Co:LMA, can be used as saturable absorber in passively Q-switched laser at wavelength ranged from 1.3~1.6 μm. Cobalt doped spinel has a large ground state absorption cross section and small excited state absorption cross section, which means less residual absorption, and is often used with many Erbium doped materials, such as phosphate laser glass, YAG and YSGG, et al. $Co:MgAl_2O_4$ has been proved to have the potential to generate short pulses by G. Karlsson et al. in "Diode-pumped Er—Yb:glass laser passively Q switched by use of $Co^{2+}$: $MgAl_2O_4$ as a saturable absorber", Applied Optics, vol. 39, No. 33, pp 6188-6192 (2000).

To generate short pulses, short resonant cavity length is required. Lasing medium and saturable absorber are made to be microchips to obtained short length and these two microchips are bonded together to form a monolithic body.

Laser pulses generated by a passive Q-switching approach has a problem of timing jitter, i.e. the pulse-to-pulse spacing deviates from the average pulse period. To achieve precise timing signal, a photodiode can be integrated in a microlaser and should have a short response time and higher sensitivity in 1.5~1.6 μm than that in wavelength of pumping laser light. In this wavelength range, InGaAs based photodiode can match this requirement, which has been widely used in optical communication and have short response time.

These and other features and advantages of the embodiments presented will be apparent from the following more detailed description of the preferred embodiments, taken in conjunction with the accompanying drawings, which illustrate by way of example, the principles of the invention.

DETAILED DESCRIPTION OF PREFERRED EMBODIMENTS

A first preferred embodiment of the present invention will now be described in detail with reference to FIG. 1. The Q-switched operation of this embodiment is based on saturable absorption in cobalt-doped MgAl6O10 of laser at a wavelength of 1.3~1.6 μm. The laser light is preferably generated by a lasing medium comprising erbium doped laser glass, neodymium doped yttrium aluminates (Nd:YAlO3), erbium or neodymium doped yttrium aluminum garnet (Er:YAG or Nd:YAG) or Neodymium doped potassiumgadolinium tungstate (Nd:KGW).

Figure 1:
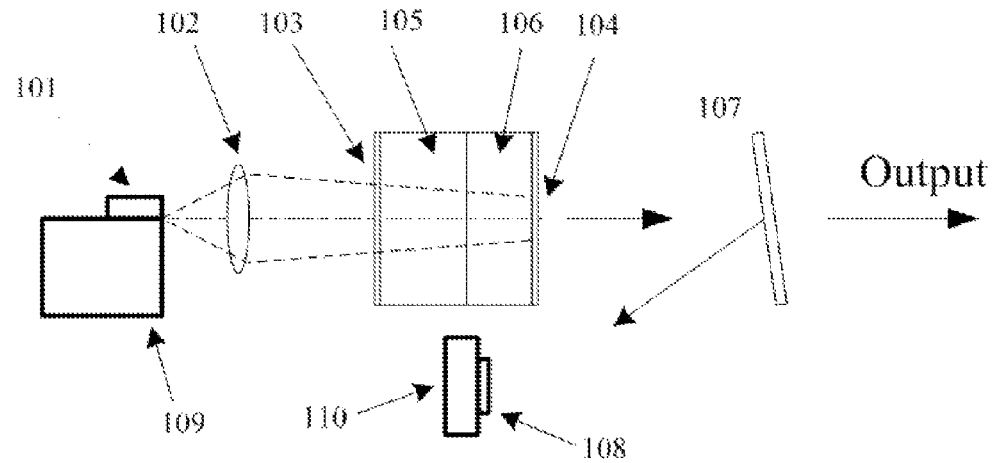
FIG. 1 is a schematic view of a passively Q-switched microlaser according to a preferred embodiment of the present invention.

FIG. 1 schematically illustrates a passively Q-switched microlaser according to the present invention. It adopts an end-pumped scheme. A pump laser diode 101 emits pumping beam and is focused into a lasing medium 105 by a focusing lens 102. The lasing diode 101 is mounted on a submount 109 made of heat conductive material, e.g. AlN. The lasing medium 105 is closer to the pump laser diode 101 than a saturable absorber 106, and both lasing medium 105 and saturable absorber 106 are disposed within a laser resonant cavity formed by first mirror 103 and second mirror 104. Both mirrors are dielectric coatings.

The lasing medium 105 supplies laser gain, while the saturable absorber 106 generates short Q-switched laser pulses. The lasing medium 105 and the saturable absorber 106 are combined together to form a monolithic body. The first mirror 103 is coated on the lasing medium 105, having high transmission of pumping beam emitted by the pump laser diode 101 and high reflectance of laser emitted by the lasing medium 105. The second mirror 104 is coated on the saturable absorber 106, having partial reflectance of laser pulses. The monolithic body of the lasing medium 105, the saturable absorber 106, the first mirror 103 and the second mirror 104, reduces the cavity loss and requires less cavity adjustment to reach high pumping efficiency.

The lasing medium 105 is erbium doped solid state materials, and it always has a wide absorption wavelength and can be efficiently pumped at wavelength from 900 nm to 1000 nm. Due to the variation of the absorption coefficient of the lasing medium 105 with pumping wavelength, the thickness of the lasing medium 105 varies with pumping laser diodes with different wavelength to ensure the lasing medium 105 absorbs enough pumping laser energy, which can be transfer into laser pulses output. The saturable absorber 106 is cobalt doped solid state material for Q-switching at a laser wavelength from 1.3~1.6 μm.

Filter 107 is used to transmit laser pulses and block residual pumping beam after absorption by the lasing medium 105. Both faces of the filter 107 have high transmission of laser pulses and at least one face has a high reflectance at the radiating wavelength of the pump laser diode 101. The filter 107 transmits most of the laser pulse energy, but still a small portion of laser pulse energy is reflected. So the filter 107 is inclinedly mounted, not perpendicular to the axis defined by the first mirror 103 and the second mirror 104 to avoid reflected laser pulses directly propagating back into the laser resonant cavity. An InGaAs photodiode 108 is used to detect laser pulses signal by receiving reflected laser pulse by filter 107. As shown in FIG. 1, the photodiode 108 is mounted on a submount 110.

Figure 2:
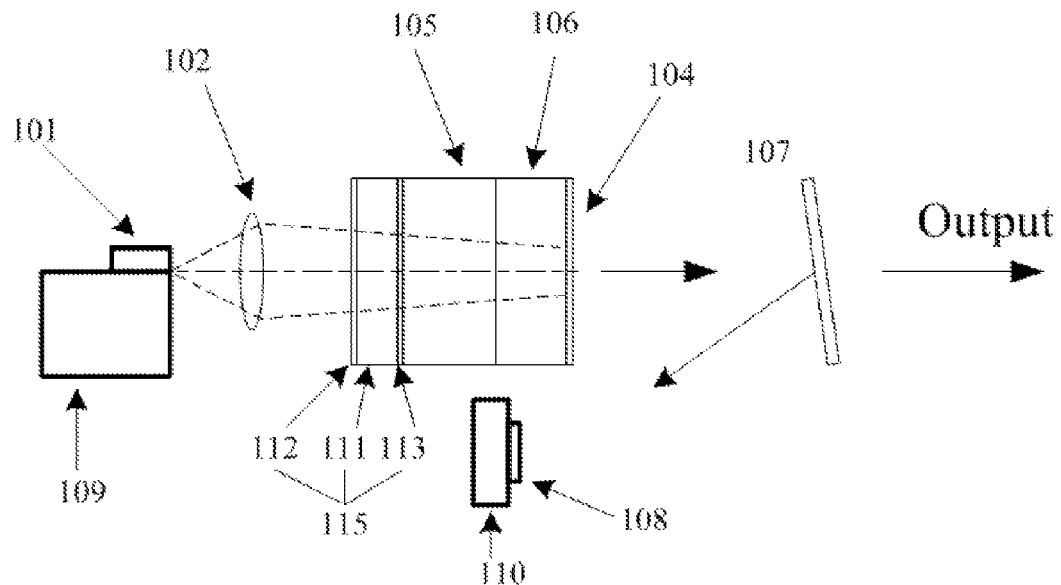
FIG. 2 schematically shows a second embodiment of passively Q-switched microlaser according to the present invention.

Another embodiment of the invention is schematically shown in FIG. 2. In this case, first mirror 115 is not a single dielectric coating directly coated on the lasing medium 105. The first mirror 115 comprises threes parts: antirefraction coating 112, optical heat spreader 111 and high refraction coating 114. The antirefraction coating 112 and the high refraction 114 are both dielectric coatings coated on different sides of optical heat spreader 111. The antirefraction coating 112 has high transmission of pumping beam emitted by the pump laser diode 101 and the high refraction coating 114 has high reflectance of laser emitted by the lasing medium 105. The antirefraction 112 is disposed closer to the pump laser diode 101 than the high refraction coating 114. The optical heat spreader 111 is transparent to pumping beam emitted by the pump laser diode 101. The first mirror 115 is bonded to lasing medium 105. The first mirror 115, the second mirror 104, the lasing medium 105 and the saturable absorber 106 form a monolithic body, while the laser resonant cavity does not include other material rather than the lasing medium 105 and the saturable absorber 106, so the cavity length does not change.

Most of pumping beam emitted by the pump laser diode 101 is absorbed by the lasing medium 105 in an absorption depth near the surface of the lasing medium 105 closer to the first mirror 115. So in this case, the first mirror 115 has a function of conducting heat generated in the lasing medium 105 and reduces the thermal load of the lasing medium 105, which means higher pump laser power or higher repetition rate of laser pulses are allowed compared with first embodiment. This reduces the effect of thermal lens in the lasing medium 105 to ensure the stability of laser output without degradation of beam quality, when pumped by relatively high power laser diode.

Figure 3:
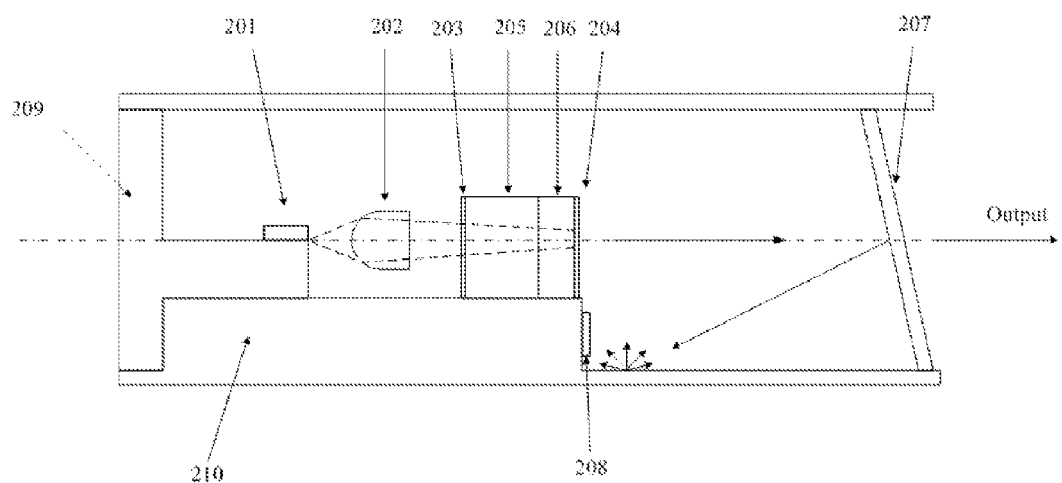
FIG. 3 schematically shows a third embodiment of passively Q-switched microlaser according to the present invention.

Another embodiment of the invention is schematically shown in FIG. 3. A passively Q-switched laser comprises a tubular laser casing 210 having a first opening end and a second opening end, a heat sink 209 sealed mounted at the first opening end of the laser casing 210. A pump laser diode 201 is mounted on heat sink for emitting a pumping beam. A focusing lens 202 collects pumping beam from the pump laser diode 201 and focuses it into a lasing medium 205. Both the lasing medium 205 and a saturable absorber 206 are disposed within a laser resonant cavity formed by a first mirror 203 and a second mirror 204. Both mirrors are dielectric coatings.

The lasing medium 205 and the saturable absorber 206 are combined together to form a monolithic body. The first mirror 203 is coated on the lasing medium 205, having high transmission of pumping beam emitted by the pump laser diode 201 and high reflectance of laser emitted by the lasing medium 205. The second mirror 104 is coated on the saturable absorber 206, having partial reflectance of laser pulses. The lasing medium 205 is erbium doped solid state material and the saturable absorber 206 is cobalt doped solid state material.

A filter 207 is used to transmit laser pulses and block residual pumping beam after absorption by the lasing medium 205. Both faces of the filter 207 have high transmission of laser pulses and at least one face has a high reflectance at the radiating wavelength of the pump laser diode 201. The filter 207 transmits most of the laser pulse energy, but still a small portion of laser pulse energy is reflected. The filter 207 is inclinedly and sealedly mounted at the second opening end of the laser casing 210, not perpendicular to the axis defined by the first mirror 203 and the second mirror 204 to avoid reflected laser pulses directly propagating back into the laser resonant cavity.

An InGaAs photodiode 208 is mounted on the laser casing 210 and is used to detect laser pulses signal. As shown in FIG. 3, the photodiode 208 does not directly receive reflected laser pulse by the filter 207. Because of high peak power, though the filter 207 reflects only a small portion of laser pulses energy, but it is still intense enough and much higher than the saturation optical power of the photodiode 208. So, in this case, reflected laser pulse beam are not directly incident on the active area of the photodiode 208, but incident on the laser casing 210. The laser casing 210 has rough surfaces. When laser pulses beam reflected by the filter 207 is incident on the rough surface, it is diffuse reflected, so only a very small portion of laser pulse energy is received by the photodiode 208. Because the laser casing 210 is sealed at two opening ends and is small enough, the laser pulses signal delay due to the multiple reflections is much smaller than the pulse width and can be ignored.

It will thus be seen that the objects of the present invention have been fully and effectively accomplished. Its embodiments have been shown and described for the purpose of illustrating the functional and structural principles of the present invention and is subject to change without departure from such principles. Therefore, this invention includes all modifications encompassed within the spirit.

What is claimed is:

1. A passively Q-switched microlaser comprising:
a pump laser diode for emitting a pumping beam;
a laser resonant cavity formed between a first mirror and a second mirror;
a lasing medium disposed within said laser resonant cavity for receiving said pumping beam to produce laser gain;
a saturable absorber disposed within said laser resonant cavity for generating laser pulses;
a filter for reflecting a portion of said laser pulses, and
a photodiode for detecting said reflected laser pulses by said filter,
wherein said lasing medium is disposed closer to said pump laser diode than said saturable absorber;
said lasing medium comprises an erbium doped solid state material;
said saturable absorber comprises a cobalt doped solid state material.

2. The microlaser as claimed in claim 1, wherein said pump laser diode emits light having a wavelength range between 915 nm and 1000 nm.

3. The microlaser as claimed in claim 1 further comprises at least one focusing device for focusing said pumping beam by said pump laser diode into said lasing medium.

4. The microlaser as claimed in claim 1, wherein said lasing medium and said saturable absorber are combined together to form a monolithic body.

5. The microlaser as claimed in claim 1, wherein said first mirror and said second mirror are dielectric coating directly coated on said monolithic body; said first mirror has high transmission of said pumping beam and high reflectance of laser pulses and is coated on said lasing medium; said second mirror has partial reflectance of laser pulses and is coated on saturable absorber.

6. The microlaser as claimed in claim 1, wherein said lasing medium material is an Erbium doped material selected from the group consisting of phosphate glass, silicate glass and fluorophosphate glass.

7. The microlaser as claimed in claim 1, wherein said saturable absorber is cobalt doped $MgAl_6O_{10}$.

8. The microlaser as claimed in claim 1, wherein said pump laser diode is operated in pulse mode.

9. The microlaser as claimed in claim 1, wherein said photodiode is an InGaAs photodiode.

10. The microlaser as claimed in claim 1, wherein said photodiode has a detection wavelength range from 1000 nm to 1650 nm.

11. The microlaser as claimed in claim 1, wherein said filter has dielectric coatings on both faces; both faces have high transmission of laser pulses and at least one face has a high reflectance at said pump laser diode wavelength.

12. The microlaser as claimed in claim 1, wherein said filter is mounted with an angle to said second mirror to reflect a portion of laser pulses.

* * * * *